(12) United States Patent
Miyake

(10) Patent No.: US 7,751,299 B2
(45) Date of Patent: Jul. 6, 2010

(54) OPTICAL PICKUP DEVICE

(75) Inventor: Kohji Miyake, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 460 days.

(21) Appl. No.: 11/932,346

(22) Filed: Oct. 31, 2007

(65) Prior Publication Data
US 2008/0112301 A1    May 15, 2008

(30) Foreign Application Priority Data
Nov. 10, 2006    (JP)    ............... 2006-305140

(51) Int. Cl.
*G11B 7/00*    (2006.01)
(52) U.S. Cl. ............ 369/112.21; 369/112.27; 369/112.28; 369/44.12; 369/44.37
(58) Field of Classification Search .......... None
See application file for complete search history.

(56) References Cited

U.S. PATENT DOCUMENTS 7,321,533 B2 *    1/2008    Katayama et al. ........ 369/53.26

2005/0002109 A1    1/2005    Tokuno
2005/0128895 A1 *    6/2005    Hoshino et al. .......... 369/44.15

FOREIGN PATENT DOCUMENTS

| CN | 1577541 | 2/2005 |
| JP | 2000-331365 A | 11/2000 |
| JP | 2003-132581 A | 5/2003 |
| JP | 2004-103176 | 4/2004 |

* cited by examiner

*Primary Examiner*—Muhammad N. Edun
(74) *Attorney, Agent, or Firm*—Morrison & Foerster LLP

(57) ABSTRACT

There is provided an inexpensive optical pickup device that is capable of accurately detecting light quantities of output laser beams on occasion of at least either of reproduction and recording on an information recording medium. A beam from a first light source 1 which beam does not pass through a wavelength selection film 6 of a light separation element 7 is reflected by a first reflection film 10 in a direction to an optical monitor 5. A beam from a second light source 2 which beam does not pass through the wavelength selection film 6 of the light separation element 7 is reflected by a second reflection film 11 in a direction to the optical monitor 5.

12 Claims, 3 Drawing Sheets

OPTICAL PICKUP DEVICE

This nonprovisional application claims priority under 35 U.S.C. §119(a) on Patent Application No. 2006-305140 filed in Japan on Nov. 10, 2006, the entire contents of which are hereby incorporated by reference.

BACKGROUND OF THE INVENTION

The present invention relates to an optical pickup device and particularly to an optical pickup device for optically performing at least either of recording and reproduction of information on an information recording medium such as optical disc.

FIG. 5 is a schematic configuration view of a conventional optical pickup device. The optical pickup device has a first light source 501, a second light source 502, an object lens 504, an optical monitor 505, and a light separation element 507. The light separation element 507 has a wavelength selection film 506.

The first light source 501 emits a first laser beam, and the second light source 502 emits a second laser beam different in wavelength from the first laser beam. The object lens 504 focuses the first laser beam and the second laser beam on a data recording surface of the optical disc 503. The optical monitor 505 detects light quantities of the first laser beam and the second laser beam. The wavelength selection film 506 reflects, in a direction of the object lens 504, the first laser beam emitted from the first light source 501 and allows the second laser beam emitted from the second light source 502 to pass therethrough, thereby making the beam incident on the object lens 504.

The beam from the first light source 501 and the beam from the second light source 502 are used for recording and reproduction on different types of optical discs. The optical monitor 505 detects the light beam emitted from the first light source 501 and having passed through the wavelength selection film 506 of the light separation element 507 and, on the other hand, detects the light beam emitted from the second light source 502 and reflected by the wavelength selection film 506 of the light separation element 507. Thus the light quantities of the laser beams that are necessary and indispensable for optically recording information on the optical disc 503 are detected and controlled.

In the optical pickup for recording, the light quantities of the outgoing laser beams are detected by the optical monitor 505 and are controlled to optimum recording powers. In a configuration of FIG. 5, the light quantities of the beams that can be used for the optical monitor 505 are restricted so as to be small because it is necessary to use most of the laser beams for the recording on the optical disc 503. More specifically, a transmittance through the wavelength selection film 506 in a path of the beam from the first light source 501 to the optical monitor 505 is set on the order of about 7%, and a reflectance through the wavelength selection film 506 in a path of the beam from the second light source 502 to the optical monitor 505 is also set on the order of about 7%.

SUMMARY OF THE INVENTION

In consideration of such background as described above, the inventor has found the following technical problems.

A change in laser wavelength with respect to temperature is on the order of about 0.2 to 0.3 nm/° C. It has been found that such temperature dependency of laser wavelength change makes it impossible to control optimum recording power on condition that there is a poor stability in quantity of light from the wavelength selection film onto the optical monitor 505 with respect to the wavelength change.

In specifications required for the optical monitor 505 by an inverse operation from the above fact, the change in light quantity on the optical monitor 505 must be not more than 0.56% with respect to a wavelength change of 10 nm. On premise of mass production, however, it has been found that achievement of the specifications, which involves an increase in price of the light separation element 507, is not realistic.

It also has been found that the wavelength selection film 506, with use of which about 8% of the beams from the first light source 501 and the second light source 502 are used for the optical monitor 505, decreases an efficiency of emission to the optical disc 503 and thus causes various problems such as increase in driving current for laser and increase in laser heat generation.

It has been found in techniques described in JP 2004-103176 A, JP 2003-132581 A and JP 2000-331365 A, in which at least either of light beams passes through a wavelength selection film or is reflected by the wavelength selection film, that wavelength change caused by change in temperature influences light quantities of the laser beams from the wavelength selection film as described above.

An object of the present invention is to provide an optical pickup device which is capable of stably and correctly monitoring light quantities of outgoing laser beams even though wavelengths of laser are changed, in which there is no need to use a wavelength selection film having unreal manufacturability, and in which a cost of manufacturing a light separation element is small.

In order to achieve the object, the optical pickup device of the invention comprises:

a first light source for emitting a first laser beam, a second light source for emitting a second laser beam having a wavelength different from a wavelength of the first laser beam, a light separation element having a wavelength selection film for reflecting the first laser beam emitted from the first light source and for allowing the second laser beam emitted from the second light source to pass therethrough, a first reflection part for reflecting the first laser beam that is emitted from the first light source and that is not incident on the wavelength selection film, and a second reflection part for reflecting the second laser beam that is emitted from the second light source and that is not incident on the wavelength selection film, an object lens for focusing the first laser beam, emitted from the first light source and reflected by the wavelength selection film, on a recording surface of an information recording medium and for focusing the second laser beam, emitted from the second light source and having passed through the wavelength selection film, on the recording surface of the information recording medium, and an optical monitor for detecting a light quantity of the first laser beam emitted from the first light source and reflected by the first reflection part and for detecting a light quantity of the second laser beam emitted from the second light source and reflected by the second reflection part.

In an embodiment, the light separation element has a first prism and a second prism, and wherein all area of one surface of the wavelength selection film is in contact with the first prism while all area of the other surface of the wavelength selection film is in contact with the second prism.

In an embodiment, part of a surface of the first prism is in contact with the second prism.

In an embodiment, the light separation element has a plurality of prisms, and wherein a flat surface that is the nearest to a light-receiving surface of the optical monitor of a plurality of flat surfaces that the plurality of prisms have is a light scattering surface.

In an embodiment, the light separation element is at least partly positioned in divergent light of the first laser beam that the first light source emits and in divergent light of the second laser beam that the second light source emits.

In an embodiment, each of the first reflection part and the second reflection part is a dielectric deposited reflection film or a metal deposited reflection film.

In an embodiment, the first reflection part effects total reflection of the first laser beam having reached the first reflection part and wherein the second reflection part effects total reflection of the second laser beam having reached the second reflection part.

An optical pickup device of an embodiment further comprises a first hologram element and a second hologram element, wherein the first hologram element is placed between the first light source and the light separation element, wherein the second hologram element is placed between the second light source and the light separation element, wherein the first reflection part reflects in a direction to the optical monitor a beam emitted from the first light source and diffracted by the first hologram element and wherein the second reflection part reflects in a direction to the optical monitor a beam emitted from the second light source and diffracted by the second hologram element.

In an embodiment, the light separation element comprises three prisms.

In an embodiment, the light separation element comprises four prisms.

In an embodiment, two or three of the prisms have different refractive indices.

In the optical pickup device of the invention, the optical monitor detects the beams that have not traveled through the wavelength selection film. Accordingly, the light quantities of the outgoing laser beams can stably and correctly be detected by the optical monitor even though wavelengths of the laser beams are changed. Besides, the wavelength selection film is not required to have a high-grade and excellent characteristic. Thus costs of manufacturing the wavelength selection film and the light separation element can be reduced.

In the optical pickup device of the invention, the beams incident on the wavelength selection film are not used for the optical monitor, and the whole beams incident on the wavelength selection film can be used for reproduction or recording on an optical disc. Therefore, an efficiency of emission to the optical disc can be increased and a current for driving laser and generation of heat from laser can be reduced.

BRIEF DESCRIPTION OF THE DRAWINGS

The present invention will become more fully understood from the detailed description given hereinbelow and the accompanying drawings which are given by way of illustration only, and thus are not intended to limit the present invention, and wherein.

DETAILED DESCRIPTION OF THE INVENTION

Figure 1:
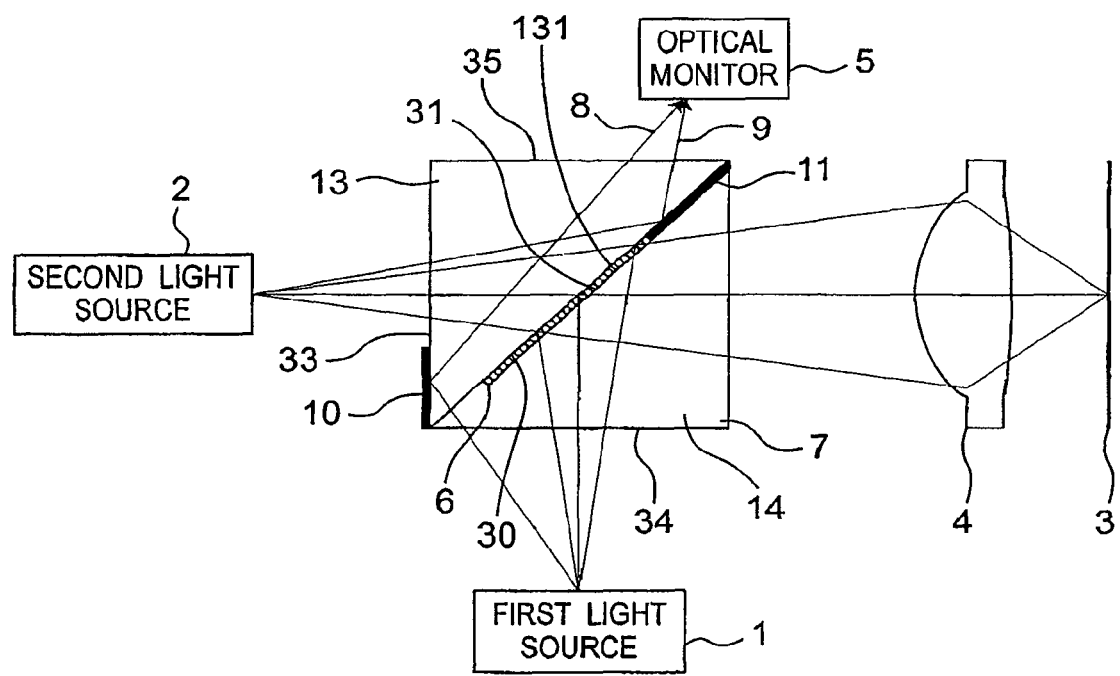
FIG. 1 is a schematic configuration view of an optical pickup device in accordance with a first embodiment of the invention.

Hereinbelow, the invention will be described in detail with reference to embodiments shown in the drawings.

First Embodiment

FIG. 1 is a schematic configuration view of an optical pickup device in accordance with a first embodiment of the invention.

The optical pickup device has a first light source 1, a second light source 2, an object lens 4, an optical monitor 5, and a light separation element 7. The light separation element 7 has a first prism 13, a second prism 14, a wavelength selection film 6, a first reflection film 10 as a first reflection part, and a second reflection film 11 as a second reflection part.

The light separation element 7 is shaped like a prism having a generally square section. The light separation element 7 is formed by junction of a surface of the first prism 13 and a surface of the second prism 14. The first prism 13 is generally identical in shape to the second prism 14. The first prism 13 and the second prism 14 are each composed of a prism having a section of a right-angled isosceles triangle in general. The first rectangular surface 30 including a hypotenuse of the right-angled isosceles triangle section of the first prism 13 is joined onto the second rectangular surface 31 including a hypotenuse of the right-angled isosceles triangle section of the second prism 14 so that the first surface 30 of the first prism 13 may not extend out of the second surface 31 of the second prism 14.

The second surface 31 of the second prism 14 has a recessed part 131 in an area excepting one end part thereof with respect to a second direction perpendicular to a direction of a normal line of the right-angled isosceles triangle section (which direction will be referred to as first direction below). The first direction is normal to the paper surface of FIG. 1 and the second direction is along the hypotenuse of the right-angled isosceles triangle section. The second reflection film 11 is formed on a surface of the other end part of the recessed part 131 with respect to the second direction, and the wavelength selection film 6 is formed on a part of the recessed part 131 where the second reflection film 11 is not formed.

A surface of the part of the second surface 31 of the second prism 14 where the recessed part 131 is not formed, a surface of the second reflection film 11, and a surface of the wavelength selection film 6 are positioned on generally the same plane. The first surface 30 of the first prism 13 is joined without gap onto the surface of the part of the second surface 31 of the second prism 14 where the recessed part 131 is not formed, onto the surface of the second reflection film 11, and onto the surface of the wavelength selection film 6. Thus the wavelength selection film 6 is formed between the first prism 13 and the second prism 14. The wavelength selection film 6 reflects beams having a wavelength of the beam from the first light source 1 and allows beams having a wavelength of the beam from the second light source 2 to pass therethrough.

The first prism 13 has a third surface 33. The third surface 33 is bounded through a corner by the first surface 30 and is positioned on a side farther from the second reflection film 11 more than another side. The first reflection film 10 is formed on an end part of the third surface 33 that is on a side of the first surface 30.

The second prism 14 has a fourth surface 34 bounded through a corner by the second surface 31. The fourth surface 34 has a rectangular shape. A general center of a laser beam emission surface of the first light source 1 is positioned on a perpendicular bisector plane (which will be referred to as first perpendicular bisector plane below), extending in a direction perpendicular to the first direction and the rectangular fourth surface 34, of the rectangular fourth surface 34. A general center of a laser beam emission surface of the second light source 2 is positioned on a perpendicular bisector plane (which will be referred to as second perpendicular bisector plane below), extending in the direction perpendicular to the first direction and the third surface 33, of the third surface 33.

The object lens 4 is positioned opposite to the second light source 2 with respect to the light separation element 7 so that a center of the object lens 4 is positioned on the second perpendicular bisector plane. The optical monitor 5 is positioned opposite to the first light source 1 with respect to the light separation element 7. In two areas partitioned by the first perpendicular bisector plane, the optical monitor 5 is positioned in the same area as the second reflection film 11 resides.

The first reflection film 10 and the second reflection film 11 are dielectric deposited reflection films or metal deposited reflection films. The first and second reflection films 10 and 11 are formed by partially masking or the like when the first and second reflection films 10 and 11 are deposited. The employment of either dielectric deposited reflection film or metal deposited reflection film as the first reflection film 10 and the second reflection film 11 results in satisfactory and stable reflection property with respect to laser beam wavelength change. The light separation element 7 is at least partly positioned in divergent light from the first light source 1 and in divergent light from the second light source 2.

In the above configuration, the first light source 1 emits a first laser beam, and the second light source 2 emits a second laser beam different in wavelength from the first laser beam. The beam from the first light source 1 is reflected in a direction of the object lens 4 by the wavelength selection film 6 of the light separation element 7 and is focused by the object lens 504 on a recording surface of the optical disc 3 as information recording medium.

The beam from the first light source 1 that has passed through part of the light separation element 7 free of the wavelength selection film 6 is reflected by the first reflection film 10 and incident on the optical monitor 5, so that a light quantity of the outgoing laser beam from the first light source 1 can be monitored.

On the other hand, the beam from the second light source 2 passes through the wavelength selection film 6 of the light separation element 7, travels to the object lens 4, and is focused by the object lens 4 on the recording surface of the optical disc 3.

A beam 9 that has been emitted from the second light source 2 and that has been reflected by the second reflection film 11 of the light separation element 7 is made incident on the optical monitor 5, so that a light quantity of the outgoing laser beam from the second light source 2 can be monitored.

Thus a beam 8 that has been emitted from the first light source 1 and that has been reflected by the first reflection film 10 is inputted into the optical monitor 5 and the beam 9 that has been emitted from the second light source 2 and that has been reflected by the second reflection film 11 is inputted into the optical monitor 5, so that the beams 8, 9 from the two light sources 1, 2 are monitored on the one optical monitor 5.

A fifth surface 35 of the light separation element 7 that faces the optical monitor 5 is a light scattering surface. The beams incident on the optical monitor 5 thus have a broad characteristic, which restrains change in light quantities on the optical monitor 5 that may be caused by positional dislocation in assembling.

In the optical pickup device of the first embodiment, the beam for the optical monitor that is emitted from the first light source 1 and that is incident on the optical monitor 5 does not pass through the wavelength selection film 6 and is not influenced by wavelength dependency of the wavelength selection film 6. In contrast to the conventional device, accordingly, an expensive film having an adequate wavelength dependency does not need to be used as the wavelength selection film 6, and thus a cost of manufacturing the light separation element 7 can remarkably be reduced.

In the optical pickup device of the first embodiment, it is unnecessary to pass part of the beam from the first light source 1 through the wavelength selection film 6 and to use the beam having passed through the wavelength selection film 6 as the beam for the optical monitor, and generally the whole beam emitted from the first light source 1 and having reached the wavelength selection film 6 can be used for information writing, with the beam from the first light source 1 reflected by 100% in general by the wavelength selection film 6 toward the object lens 4. Therefore, an efficiency of emission to the optical disc can remarkably be increased. As a result, a current for driving laser and generation of heat from laser can be reduced.

In the optical pickup device of the first embodiment, the light separation element 7 is at least partly positioned in the divergent light from the first light source 1 and in the divergent light from the second light source 2 and is placed in a position near to both the light sources 1 and 2 so that a size of the light separation element 7 can be decreased and a price of the light separation element 7 can be lowered.

Figure 2:
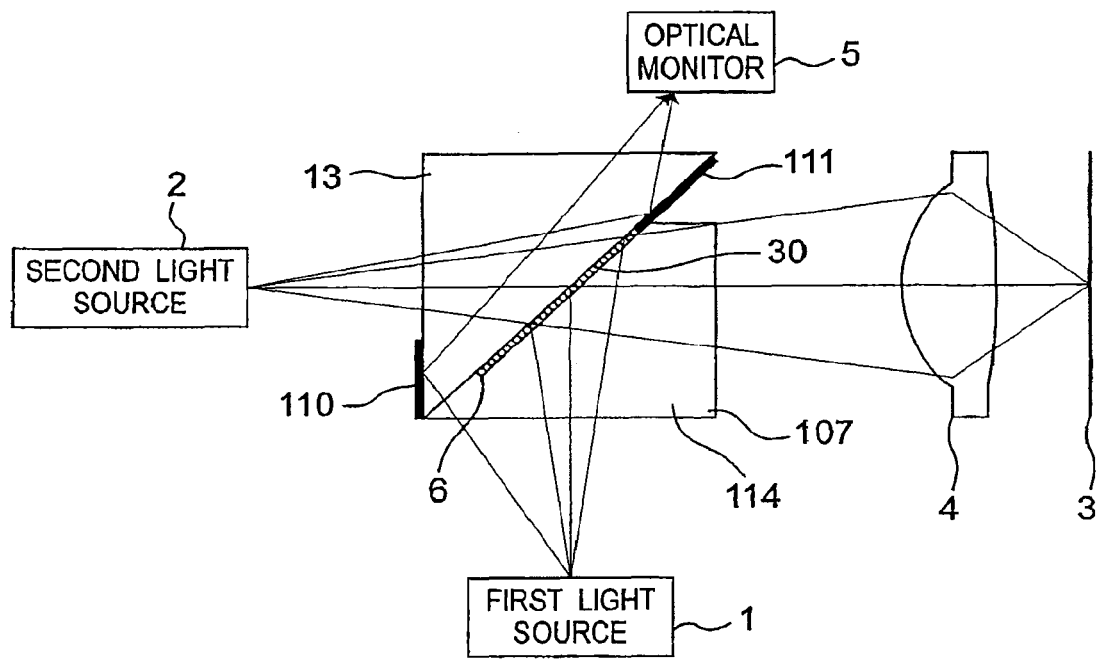
FIG. 2 is a schematic configuration view of an optical pickup device in accordance with a second embodiment of the invention.

In the optical pickup device of the first embodiment, the second surface 31 of the second prism 14 has the recessed part 131 in the area excepting one end part thereof with respect to the second direction perpendicular to the direction of the normal line of the right-angled isosceles triangle section of the second prism 14. The recessed part 131, however, is not necessarily required. The second surface 31 of the second prism 14 may be plane. Although not shown, the device may have any configuration as long as the second reflection film 11 and the wavelength selection film 6 may be formed at a site where the first surface 30 of the first prism 13 and the second surface 31 of the second prism 14 are joined to each other so that the wavelength selection film 6 reflects beams having the wavelength of the beam from the first light source 1 and allows beams having the wavelength of the beam from the second light source 2 to pass therethrough and as long as the beam from the second light source 2 is reflected by the second reflection film 11 and is made incident on the optical monitor 5, Second Embodiment FIG. 2 is a schematic configuration view of an optical pickup device in accordance with a second embodiment of the invention.

The optical pickup device of the second embodiment is different from the optical pickup device of the first embodiment in that the second embodiment employs a second prism 114 in which a corner portion has been cut off from a prism having an isosceles triangle section and in that a first reflection film 110 and a second reflection film 111 have a characteristic of effecting total reflection of light.

For the optical pickup device of the second embodiment, the same components as those of the optical pickup device of the first embodiment are designated by the same reference numerals and description thereof is omitted. For the optical pickup device of the second embodiment, description is omitted on operational effects common to the optical pickup device of the first embodiment and will be given only on configurations and operational effects different from those of the optical pickup device of the first embodiment.

In the second embodiment, the second reflection film 111 is formed on an end part of the first surface 30 of the first prism 13 that is on a side of the optical monitor 5. A second prism 114 has a shape such that a corner portion has been cut off from a prism having an isosceles triangle section.

In a state in which the first prism 13 and the second prism 114 have been stuck on each other, a surface of the second reflection film 111 is in contact with air and is exposed. The first reflection film 110 and the second reflection film 111 effect total reflection of light.

The second reflection film 111 has the surface in contact with air. Therefore, a beam having traveled from the second light source 2 is incident from optically dense medium (the first prism 13) on optically sparse medium (air). With the surface of the second reflection film 111 in contact with air, the beam from the second light source 2 undergoes total reflection on the second reflection film 111.

In the second embodiment, the surface of the second reflection film 111 is made to be in contact with air, with use of the second prism 114 having the shape in which the corner portion has been cut off from the prism having the isosceles triangle section, so that a beam having traveled from the second light source 2 is incident from optically dense medium (the first prism 13) on optically sparse medium (air). Thus the beam from the second light source 2 undergoes total reflection on the second reflection film 111 without use of an expensive film as the second reflection film 111. As a result, a cost of manufacturing the light separation element 107 can be reduced.

Third Embodiment

Figure 3:
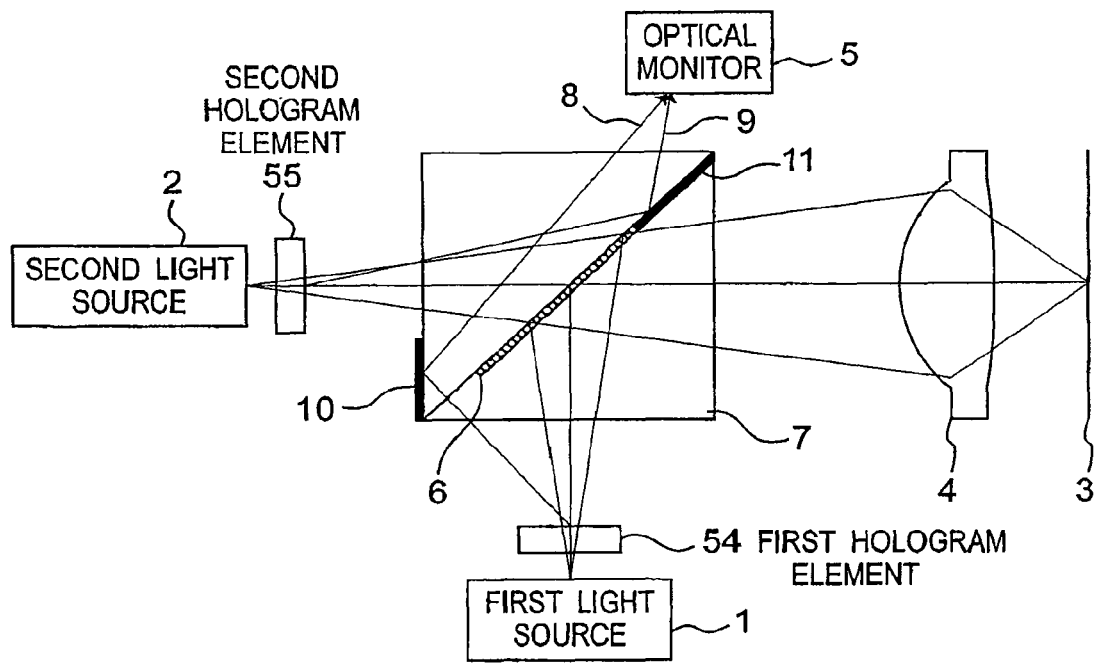
FIG. 3 is a schematic configuration view of an optical pickup device in accordance with a third embodiment of the invention.

FIG. 3 is a schematic configuration view of an optical pickup device in accordance with a third embodiment of the invention.

The optical pickup device of the third embodiment is different from the optical pickup device of the first embodiment in that a first hologram element 54 is placed between the first light source 1 and the light separation element 7 and in that a second hologram element 55 is placed between the second light source 2 and the light separation element 7.

For the optical pickup device of the third embodiment, the same components as those of the optical pickup device of the first embodiment are designated by the same reference numerals and description thereof is omitted. For the optical pickup device of the third embodiment, description is omitted on operational effects common to the optical pickup device of the first embodiment and will be given only on configurations and operational effects different from those of the optical pickup device of the first embodiment.

In the third embodiment, a beam that has been emitted from the first light source 1 and that has undergone primary diffraction in the first hologram element 54 is incident on the first reflection film 10 and a beam that has been emitted from the second light source and that has undergone primary diffraction in the second hologram element 55 is incident on the second reflection film 11.

In the third embodiment, beams from the light sources 1, 2 are guided to the reflection films 10, 11 with use of the hologram elements 54, 55. Therefore, degrees of freedom can be increased for positions of the light sources 1, 2 and thus for a space in which the optical pickup device is positioned.

Fourth Embodiment

Figure 4:
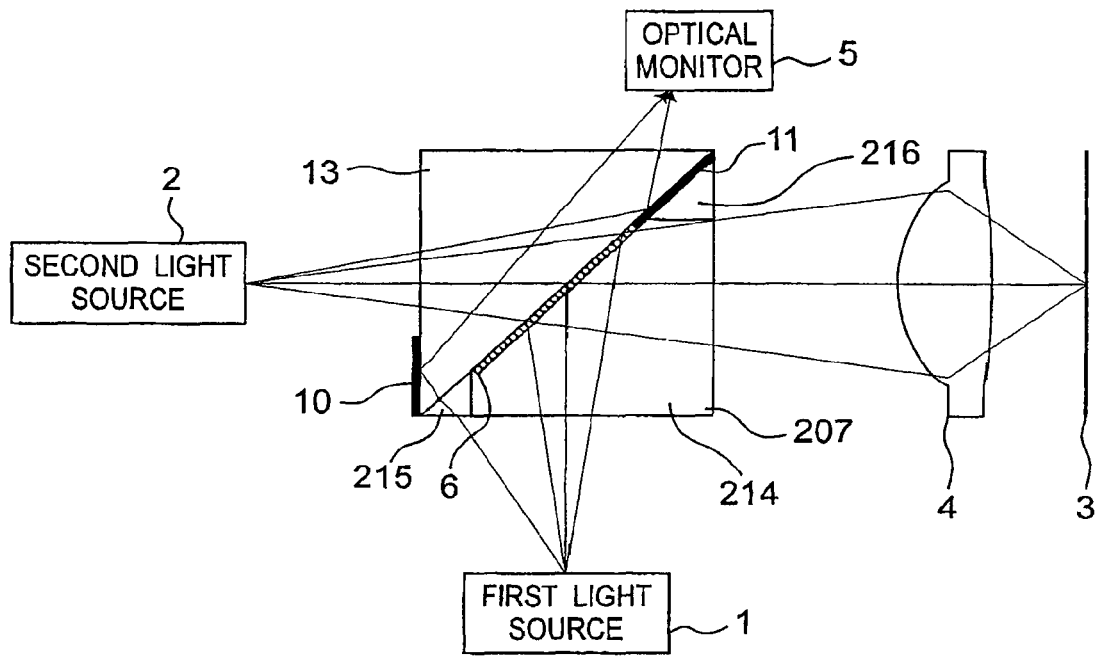
FIG. 4 is a schematic configuration view of an optical pickup device in accordance with a fourth embodiment of the invention.
Figure 5:
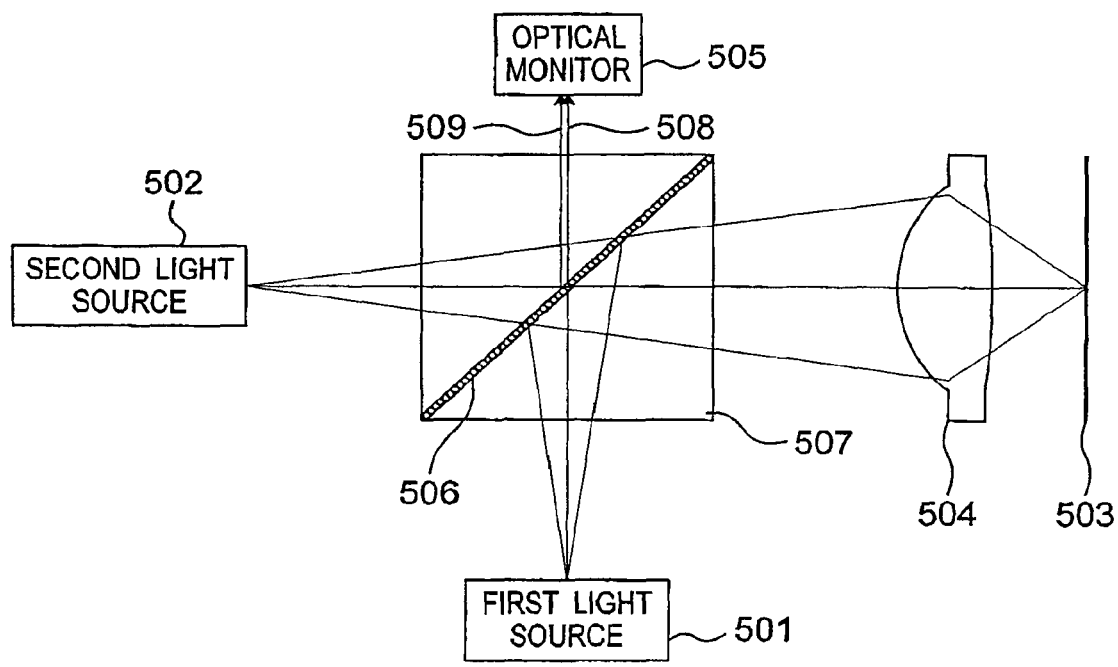
FIG. 5 is a schematic configuration view of a conventional optical pickup device.

FIG. 4 is a schematic configuration view of an optical pickup device in accordance with a fourth embodiment of the invention.

The optical pickup device of the fourth embodiment is different from the optical pickup device of the first embodiment in that the second prism 14 in FIG. 1 is replaced by three prisms, i.e., a second prism 114 in which two prism-like corner portions each having a right-angled isosceles triangle section have been cut off, a third prism 215, and a fourth prism 216, with the corner portion of the second prism 14 in FIG. 1 nearest to the first reflection film 10 replaced by the third prism 215 and with the corner portion of the second prism 14 in FIG. 1 nearest to the second reflection film 11 replaced by the fourth prism 216.

For the optical pickup device of the fourth embodiment, the same components as those of the optical pickup device of the first embodiment are designated by the same reference numerals and description thereof is omitted. For the optical pickup device of the fourth embodiment, description is omitted on operational effects common to the optical pickup device of the first embodiment and will be given only on configurations, operational effects, and modifications different from those of the optical pickup device of the first embodiment.

The third prism 215 is made of material that is different in refractive index from materials of other prisms 13, 214, and 216. With use of refraction of light, in this manner, a beam that is emitted from the first light source 1 and that is incident on the first reflection film 10 is efficiently and accurately guided to the optical monitor 5.

In an optical pickup device, restraints such as restriction on positions of optical systems and shapes of prisms may make it impossible to guide beams from light sources to an optical monitor. In the fourth embodiment, a refractive index of the third prism 215 can adequately be changed and thus the restraints such as restriction on positions of optical systems and shapes of prisms can be relaxed. Consequently, degree of freedom of design can be increased. In addition, the reflection film 11 is formed on the fourth prism 216, while the wavelength selection film 6 is formed on the second prism 214. Therefore, degree of freedom can be increased for a position of the reflection film 11 relative to the wavelength selection film 6 and the reflection film 11 can be formed in more accurate position.

Though the light separation elements 7, 207 are formed of two or four prisms in the above embodiments, the light separation element of the invention may be formed of three prisms. In the fourth embodiment, for example, there may be employed a prism in which the second prism 214 and the fourth prism 216 are integrated, and the light separation element may be formed of three prisms. The light separation element of the invention may be formed of five or more prisms.

In the fourth embodiment, three prisms have the same refractive index among the four prisms 13, 214, 215, and 216. In the invention, however, a number of prisms having the same refractive index among the four prisms may be one (that is, all the indices are different) or two. In the light separation element made of three prisms, a number of prisms having the same refractive index may be one (that is, all the indices are different) or two.

Embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical pickup device comprising:
   a first light source for emitting a first laser beam,
   a second light source for emitting a second laser beam having a wavelength different from a wavelength of the first laser beam,
   a light separation element having a wavelength selection film for reflecting the first laser beam emitted from the first light source and for allowing the second laser beam emitted from the second light source to pass therethrough, a first reflection part for reflecting the first laser beam that is emitted from the first light source and that is not incident on the wavelength selection film, and a second reflection part for reflecting the second laser beam that is emitted from the second light source and that is not incident on the wavelength selection film,
   an object lens for focusing the first laser beam, emitted from the first light source and reflected by the wavelength selection film, on a recording surface of an information recording medium and for focusing the second laser beam, emitted from the second light source and having passed through the wavelength selection film, on the recording surface of the information recording medium, and
   an optical monitor for detecting a light quantity of the first laser beam emitted from the first light source and reflected by the first reflection part and for detecting a light quantity of the second laser beam emitted from the second light source and reflected by the second reflection part.

2. An optical pickup device as claimed in claim 1,
   wherein the light separation element has a first prism and a second prism, and
   wherein all area of one surface of the wavelength selection film is in contact with the first prism while all area of the other surface of the wavelength selection film is in contact with the second prism.

3. An optical pickup device as claimed in claim 2,
   wherein part of a surface of the first prism is in contact with the second prism.

4. An optical pickup device as claimed in claim 1,
   wherein the light separation element has a plurality of prisms, and
   wherein a flat surface that is the nearest to a light-receiving surface of the optical monitor of a plurality of flat surfaces that the plurality of prisms have is a light scattering surface.

5. An optical pickup device as claimed in claim 1,
   wherein the light separation element is at least partly positioned in divergent light of the first laser beam that the first light source emits and in divergent light of the second laser beam that the second light source emits.

6. An optical pickup device as claimed in claim 1,
   wherein each of the first reflection part and the second reflection part is a dielectric deposited reflection film or a metal deposited reflection film.

7. An optical pickup device as claimed in claim 1,
   wherein the first reflection part effects total reflection of the first laser beam having reached the first reflection part and wherein the second reflection part effects total reflection of the second laser beam having reached the second reflection part.

8. An optical pickup device as claimed in claim 1, further comprising a first hologram element and a second hologram element,
   wherein the first hologram element is placed between the first light source and the light separation element,
   wherein the second hologram element is placed between the second light source and the light separation element,
   wherein the first reflection part reflects in a direction to the optical monitor a beam emitted from the first light source and diffracted by the first hologram element and wherein the second reflection part reflects in a direction to the optical monitor a beam emitted from the second light source and diffracted by the second hologram element.

9. An optical pickup device as claimed in claim 1,
   wherein the light separation element comprises three prisms.

10. An optical pickup device as claimed in claim 9,
    wherein two or three of the prisms have different refractive indices.

11. An optical pickup device as claimed in claim 1,
    wherein the light separation element comprises four prisms.

12. An optical pickup device as claimed in claim 11,
    wherein two or three of the prisms have different refractive indices.

* * * * *